(12) United States Patent
Rose et al.

(10) Patent No.: US 12,343,826 B2
(45) Date of Patent: Jul. 1, 2025

(54) WIRE FEED DEVICE AND METHOD FOR FEEDING WIRE

(71) Applicant: Alexander Binzel Schweisstechnik GmbH & Co. KG, Buseck (DE)

(72) Inventors: Sascha Rose, Fernwald (DE); Udo-Ralf Kessler, Fernwald (DE); Matthias Bender, Giessen (DE); Ralf Hellmig, Solms (DE)

(73) Assignee: Alexander Binzel Schweisstechnik GmbH & Co. KG, Buseck (DE)

( * ) Notice: Subject to any disclaimer, the term of this patent is extended or adjusted under 35 U.S.C. 154(b) by 938 days.

(21) Appl. No.: 17/428,041

(22) PCT Filed: Feb. 4, 2020

(86) PCT No.: PCT/EP2020/052659
§ 371 (c)(1),
(2) Date: Aug. 3, 2021

(87) PCT Pub. No.: WO2020/164949
PCT Pub. Date: Aug. 20, 2020

(65) Prior Publication Data
US 2022/0105586 A1    Apr. 7, 2022

(30) Foreign Application Priority Data
Feb. 14, 2019 (DE) .......... 102019103740.9

(51) Int. Cl.
*B23K 9/12* (2006.01)
*B23K 9/133* (2006.01)
*B65H 51/10* (2006.01)

(52) U.S. Cl.
CPC ............ *B23K 9/125* (2013.01); *B23K 9/1336* (2013.01); *B65H 51/10* (2013.01); *B65H 2701/36* (2013.01)

(58) Field of Classification Search
CPC ........ B23K 9/095; B23K 9/0956; B23K 9/12; B23K 9/124; B23K 9/125; B23K 9/126;
(Continued)

(56) References Cited

U.S. PATENT DOCUMENTS 2,053,260 A   9/1936   Blashill
2,915,171 A   12/1959  Peck
(Continued)

FOREIGN PATENT DOCUMENTS

CN   1964814 A     5/2007
CN   107866623 A   4/2018
(Continued)

*Primary Examiner* — Hung D Nguyen
(74) *Attorney, Agent, or Firm* — Rogowski Law LLC (57) ABSTRACT

The invention relates to a wire-feed device for conveying a wire and to a method for feeding wire using a wire-feed device, in particular for a thermal joining apparatus, having at least one a drive element which can be operated by a feed drive and can be placed against a wire guided through the wire-feed device, exerting a contact pressure, in order to transfer drive movement by friction. According to the invention, an actuator which is coupled to the at least one drive element and can be controlled by a controller using the values measured for the contact pressure, is provided for variably setting the contact pressure acting on the wire.

3 Claims, 10 Drawing Sheets

(58) Field of Classification Search
CPC ...... B23K 9/133; B23K 9/1336; B65H 51/10; B65H 2701/36
See application file for complete search history.

(56) References Cited

U.S. PATENT DOCUMENTS

| | | | |
|---|---|---|---|
| 8,642,922 B2 | 2/2014 | Flattinger | |
| 9,229,436 B2 | 1/2016 | Stumpfl | |
| 2005/0224485 A1 | 10/2005 | Matiash | |
| 2007/0241161 A1* | 10/2007 | Kronegger | B23K 9/1336 |
| | | | 226/187 |
| 2017/0165779 A1* | 6/2017 | Barhorst | B23K 9/125 |

FOREIGN PATENT DOCUMENTS

| | | | | |
|---|---|---|---|---|
| CN | 109093230 A | 12/2018 | | |
| DE | 1059644 B | 6/1959 | | |
| DE | 250512 A1 | 10/1987 | | |
| DE | 3719907 A1 | 1/1988 | | |
| DE | 29915301 U1 * | 7/2000 | ............. | B23K 9/125 |
| DE | 202005022102 U1 | 10/2013 | | |
| DE | 102015003083 A1 | 9/2016 | | |
| EP | 1384547 A2 | 1/2004 | | |
| FR | 2624418 A | 6/1989 | | |
| WO | 2005120760 A1 | 12/2005 | | |
| WO | 2012162709 A1 | 12/2012 | | |

* cited by examiner

WIRE FEED DEVICE AND METHOD FOR FEEDING WIRE

CROSS-REFERENCE TO RELATED APPLICATIONS

This application is a national stage application (under 35 USC § 371) of PCT/EP2020/052659, filed Feb. 4, 2020, which claims benefit of German application No. 10 2019 103 740.9, filed Feb. 14, 2019, the contents of each of which are incorporated by reference herein.

BACKGROUND OF THE INVENTION

Technical Field and State of the Art

The invention relates to wire-feed devices or methods for operating such wire-feed devices which are employed in thermal joining apparatuses with a consumable electrode or with a filler material fed in the form of a wire. These can be, for example, welding or soldering torches for the metal shielding-gas (MSG) welding method, especially for MIG or MAG methods. In this context, MIG stands for the so-called "metal inert gas" method while MAG stands for the so-called "metal active gas" method. The present invention can also relate to cold-wire drives and hot-wire drives for tungsten inert gas (TIG) and plasma welding device apparatuses, laser methods as well as hybrid methods, for instance, MSG-laser-hybrid or tandem methods in which filler materials in the form of a wire are fed separately to the joining sites.

Aside from its conceivable use in the realm of manually guided welding torches, the subject matter of the invention especially relates to wire-feed devices that are employed in machine-guided torches. Machine-guided torches are torches that are not operated by people, in other words, by hand, but rather by a machine, for instance, by a multiaxial robot.

A wire-feed device of the generic type comprises at least one drive element that serves to frictionally impart a driving movement to a wire electrode or to a wire that is passing through the wire-feed device.

Wire-feed devices of different types are disclosed in the state of the art, for example, in French patent publication FR 2 624 418, German utility model DE 20 2005 022 102 U1, U.S. Pat. Nos. 2,915,171 A and 2,053,260 A, European patent EP 1 384 547 B1, German published patent application DE 1 059 644 B or East German formal examination—provisional economic patent DD 250 512 A1.

The wire-feed devices shown there are used primarily in welding machines. In this context, in each case, at least one drive element is provided that presses with a contact pressure against the wire that is to be conveyed or against the wire electrode that is to be conveyed, a process in which it concurrently transmits a feeding movement to it. The contact pressure is normally set manually. For this reason, many manufacturers of wire-feed devices provide recommendations for the manual setting of the contact pressure for certain wire materials and wire diameters. As a rule, this is indicated in the form of a manufacturers sticker on the wire feeder together with the geometries of the wire-conveying rollers.

Sometimes, manually adjustable spring mechanisms are used that exert a pretension onto the wire or wire electrode. The contact pressure here is dependent on the deformation of the pretensioning spring.

U.S. Pat. Appln. No. 2007/0241161 A1 discloses a wire-transport device for transporting a welding wire from a wire supply to a welding torch by means of a conveying mechanism consisting of at least one drive roller and at least one pressure roller. An adjustment mechanism having an elastically or plastically deformable pressure means that acts on the at least one pressure roller is provided for purposes of adapting the contact pressure exerted by the conveying mechanisms onto the welding wire.

German laid-open application DE 10 2015 003 083 A1 discloses a welding device with a wire-feed device having a feeding area for feeding the welding wire to the wire-feed device and having a discharge area for discharging the welding wire out of the wire-feed device. Between the feeding area and the discharge area, there is a conveying mechanism for conveying the welding wire and a contact pressure means for pressing the welding wire against the conveying mechanism.

European patent EP 2 640 544 B1 discloses a method for determining the target value for the contact pressure of the conveying rollers of a device for conveying a welding wire of a welding device. The target value for the contact pressure is ascertained empirically or mathematically as a function of prescribed parameters and then set on the conveying mechanism. The data pertaining to the prescribed parameters together with additional parameters relating to the configuration of the welding device is stored in a database along with the appertaining empirically ascertained target values for the contact pressure or with a calculation specification for calculating the appertaining target values for the contact pressure.

A drawback of the manual setting of the contact pressure is that machine operators often set the maximally available contact pressure, in spite of the manufacturer's specification of a prescribed contact pressure. On the one hand, this is done for the sake of convenience and, on the other hand, for fear of possible slippage between the drive element and the wire or the wire electrode. After all, the occurrence of slippage between the drive element and the wire or the wire electrode should be avoided at all costs since this would cause an insufficient amount of material of the consumable wire electrode to enter the melting area at the front end of the welding or soldering torch. In such a case, there would not be sufficient material to build up the welding seam or soldering seam, which would translate into a weld of diminished quality. Particularly with machine-guided joining processes, such a quality defect has to be avoided at all costs.

Another reason is that drives are very difficult to access, especially in complex installations. This is why continuous monitoring as well as regular manual adjustment of the contact pressure either are not possible at all or else only with great difficulty.

Cases in which operators frequently set the contact pressure to the maximum value are associated with both short-term and long-term disadvantages. For one thing, excessive contact pressures give rise to greater mechanical wear and tear in the wire-feed device. Moreover, excessive pretensioning forces can cause the wire that is to be conveyed to be subjected to a force that exceeds its elasticity range so that it is plastically deformed in an impermissible manner when it passes through the wire-feed device. For instance, an excessive contact pressure can deform an originally circular cross section of a wire into, for example, an elliptical or angled cross section, thereby leading to problems during conveyance or during electric contacting in welding or soldering torches, or else can cause greater wear and tear, thus detrimentally affecting the quality of the joined connection due to process irregularities. Finally, unnecessarily high contact pressures raise the energy consumption of the wire-feed device and shorten its service life.

Before the backdrop of the above-mentioned disadvantages, the invention is based on an objective of putting forward an improved wire-feed device as well as a method for feeding a wire by means of which operating errors are reduced and a high level of quality can be achieved for the thermally joined connections.

The resulting additional objective of the present invention consists primarily in minimizing wear and tear in the drive system, in this process improving the achievable weld quality to the extent possible and also keeping the process stable and, if at all possible, reducing the energy consumption of the wire-feed device.

SUMMARY OF THE INVENTION

The invention relates to a wire-feed device to convey a wire, especially for a thermal joining apparatus, having at least one drive element that can be operated by a feed drive and that can be positioned onto a wire that is passing through the wire-feed device, thereby exerting a contact pressure, in order to frictionally transmit a driving movement.

According to the invention, an actuator that is coupled to the at least one drive element and that can be controlled by a control unit using the values measured for the contact pressure is provided for variably setting the contact pressure that acts upon the wire. In this manner, any faulty operation caused by the user can be ruled out or else rendered less likely. In this process, the variable setting or adjustment of the contact pressure is preferably carried out while the feed drive is running. Setting the contact pressure, which is preferably done by means of an electric motor, allows optimal setting, even of drives that are physically difficult to access because of having been integrated into complex installations. For this purpose, the system can be simplified in such a way that it does not involve an active regulation in the process that would cause the force to vary, but rather, the setting is carried out by means of remote control employing, for example, Panel, Bluetooth, WLAN, etc.

Another advantage consists of the fact that far finer adjustments of the contact pressure can be made, which is particularly advantageous in the case of soft soldering wires.

According to a first advantageous embodiment of the invention, a coupling gear, especially a pressure rocker, is provided between the drive element and the actuator. For one thing, an actuator-generated clamping movement which serves to set the contact pressure can be reduced in a suitable manner so that it is also possible to use an actuator whose stroke between its end positions is relatively large. At the same time, a suitable selection of the reduction of the coupling gear allows the operating point of the actuator to be set in such a way that the force generated by the actuator can be controlled or regulated particularly easily.

In another advantageous embodiment of the invention, the coupling gear, especially the pressure rocker, has a restoring spring whose restoring force acts counter to the contact pressure. The control or regulation of the actuator can be further simplified when a restoring spring is used whose restoring force first has to be overcome by the actuator when the contact pressure is being generated.

According to another variant of the invention, the coupling gear or the pressure rocker is provided with an actuating cam that preferably constitutes the output of the actuator, and a pressure tappet that can be actuated with the actuating cam and that is coupled to the drive element. Such a configuration of the coupling gear dispenses with the need for a mechanically fixed connection between the actuator and the drive element so that, for instance, the installation, maintenance and repair of the wire-feed device can all be done more easily. Moreover, a suitable configuration of the cam shape can even achieve a variable transmission capability that can be varied by the stroke of the pressure tappet, a measure that can further simplify the control and regulation of the actuator.

According to the invention, the actuator has a measuring means to determine the actuator position and/or the actuator force. This configuration makes it possible to estimate the contact pressure by making use of a simple determination of the position in the force-transmission train, in other words, between the actuator and the drive element. This allows an indirect measurement of the magnitude of the contact pressure. It is also possible to make a direct determination of the contact pressure by measuring the actuator force—in other words, for example, the force present at the output of the actuator—thus allowing a direct conclusion to be drawn about the contact pressure on the drive element. In order to determine the contact pressure on the drive element, it may conceivably be necessary to still mathematically take into account a force reinforcement factor brought about by a coupling gear.

According to the invention, at least one measuring means is provided for determining the feed of the wire and/or for monitoring the wire geometry. When the actuator is activated by means of the control unit, measured values obtained from a measuring means can be taken into consideration, so that there is always a sufficiently high contact pressure while, at the same time, if at all possible, no high contact pressure is being exerted onto the wire. Accordingly, the control variable for setting the contact pressure is the wire feed. In this manner, undesired slippage between the drive element and the wire can be reliably prevented. At the same time, excessive contact pressures and thus premature wear and tear of the components can be prevented. For one thing, the wire can be fed on the basis of a measurement that is made directly on the wire, for instance, by means of a measuring wheel that is in direct contact with the wire. As an alternative, the motor current of the drive that generates the driving movement can be measured.

The wire geometry or a so-called deformation control serves as the basis for a plausibility control in order to select the material for the process parameters such as, for instance, the welding power and the contact pressure. If, for example, a given material exhibits a defined deformation at a prescribed set pressure, then it can be assumed that the setting of the material-dependent contact pressure is highly likely to correspond to the appertaining material. Recognition of the deformation within the scope of threading the wire into the device is advantageous for recognizing an incorrect material selection before the welding procedure actually starts. Even though it is also possible to indirectly recognize an incorrect material on the basis of impermissible welding parameters, the component might already have been damaged in such a case. The deformation control allows recognition of an incorrect material already while the wire is being threaded in.

In another variant of the invention, the at least one measuring means detects the feed or the wire geometry optically or mechanically. For one thing, optical detection of the feed or of the wire geometry entails the advantage that the measurement can be made contactlessly and thus practically without any wear and tear. Mechanical detection is normally more cost effective to implement and, under industrial application conditions, conceivably much less susceptible to the impurities that occur there.

It is conceivable to convey wires having different diameters. For this reason, conveying rollers adapted to the wire diameter can be provided, so that, as a result, it is always ensured that approximately the same amount of wire is unrolled by the conveying rollers, even in the case of different wire diameters. This adaptation of the conveying rollers can be implemented by means of different groove shapes that are created on the surface of the conveying rollers. In this manner, despite different wire diameters, the amount of wire can be derived from the rotational speed. Moreover, due to this adaptation of the conveying rollers, no provision needs to be made for a feedback to the motor control unit. This allows the contact pressure acting on the wire to be set according to the invention independently of the wire drive.

An independent idea of the invention puts forward a method for feeding a wire that is passing through the wire-feed device, especially a wire-feed device of the type described above. A driving movement generated by means of a feed drive is frictionally transmitted to the wire by means of a drive element coupled to the feed drive, a process in which the drive element presses against the wire with a contact pressure.

The method according to the invention also provides for the contact pressure to be variably adjustable to various values by means of an actuator that is controlled and/or regulated on the basis of the measured values for the contact pressure.

The invention now allows the contact pressure that acts upon the wire that is to be conveyed to now be manually set in such a way that slippage between the drive element and the wire can be prevented or at least reduced to an acceptable level. Moreover, the mechanical setting makes it possible to avoid an excessive contact pressure, thus reducing the wear and tear in the entire device, and to also achieve the wire geometry necessary for a good welding quality. The method can preferably be carried out with a wire-feed device. The contact pressure can be set to various values by means of a controlled and/or regulated actuator.

According to a first advantageous refinement of the method, the contact pressure is controlled and/or regulated as a function of at least one wire-conveying parameter, preferably the slippage between the drive element and the wire that is to be conveyed, and/or as a function of the prescribed feed and/or the ascertained wire geometry, and/or as a function of a welding parameter, especially the welding current. In this manner, faulty operation by the user can be virtually ruled out. Consequently, manually setting or subsequently adapting the contact pressure in order to set up the wire-feed device are rendered superfluous. In this manner, since the desired feed is ensured, the only contact pressure that is set is the one required for a proper welding procedure.

According to the invention, when the wire-feed device is put into operation, the contact pressure is set at an initial value and increased to a value above a slippage limit if slippage between the drive element and the wire occurs. In this manner, it can be ensured with great probability that not only the slippage currently taking place but also a conceivable new slippage caused by greater mechanical resistance while the wire is being conveyed can be prevented or be considerably reduced. A so-called "safety margin" is kept vis-à-vis the slippage limit, in other words, vis-à-vis the value of the contact pressure at which slippage no longer occurs under the momentary circumstances.

According to the invention, the initial value of the contact pressure corresponds to the most recent value set for the contact pressure and, in the absence of slippage between the drive element and the wire during ongoing operation of the wire-feed device, the contact pressure is reduced and, if slippage occurs anew, it is raised once again to a value above the slippage limit. With this supplementation of the algorithm on which the control or regulation is based, it is possible to reduce the contact pressure acting upon the wire during ongoing operation of the wire-feed device to the level required for ensuring a proper welding procedure.

In another variant, the contact pressure is set incrementally to discrete values. This allows a simple actuation of the actuator. As an alternative, the contact pressure can be set continuously or virtually continuously to different values. Continuous or virtually continuous setting of the values for the contact pressure permits a very fine control or regulation. The term "virtually continuously" should be construed to mean that a control unit that activates the actuator is operated at its highest possible resolution at its output. In contrast, the term "set incrementally" to discrete values of the contact pressure is to be construed to mean that, within the value range for the activation of the actuator, only very few fixed values have been preset for the contact pressure and that the latter can be set each time to one of these fixed values.

In another advantageous embodiment of the invention, the contact pressure is regulated as a function of a parameter measured on the wire-feed device or on a welding unit that is connected to the wire-feed device. In this manner, intervention by a user for purposes of setting or adjusting the correct contact pressure can be completely dispensed with. Therefore, for one thing, the mechanical wear and tear occurring in the device can be further reduced and the quality of the welded connection can be further improved.

For example, envelope monitoring is conceivable, whereby, especially when the wire-feed device is new, a one-time reference curve is acquired from the component, a process in which a force-over-time curve or force-over-distance curve is recorded. This could then serve as a reference curve for presetting the force and also as a baseline value for so-called "condition monitoring".

According to another advantageous embodiment of the invention, an algorithm upon which the regulation is based is provided according to the principle of a proportional (P) controller, a proportional-integral (PI) controller, a proportional-integral-derivative (PID) controller, an integral (I) controller or a proportional-derivative (PD) controller. With such a regulation, initially a control deviation is ascertained on the basis of the deviation of the measured parameter from a parameter prescribed value. This can be, for instance, the slippage. The parameter prescribed value for the slippage is always zero or almost zero. The magnitude of the increase or decrease in the contact pressure then results as a function of the magnitude of the control deviation and/or of the rate of change of the control deviation. For one thing, this allows not only a more exact but also a faster regulation. Precisely when the slippage between the drive element and the wire is employed as the reference variable for the regulation, in other words, as the decisive parameter, is there a need for very fast regulation of the pretensioning force.

According to another advantageous embodiment of the invention, it is provided that values to which the contact pressure is modified or adjusted are temporarily stored and evaluated in order to ascertain the system state. This variant relates to condition monitoring. In this context, the monitoring of the contact pressure is meant to indirectly yield information about the state of the wire-conveying system. This means that, if a given force is exceeded, it can be assumed that the system components are worn-out or dirty, thus requiring replacement or cleaning, but that a complete failure during ongoing operation is avoided.

Discrete values or envelopes (see above) can be employed for the monitoring. In addition, it can also be monitored for how long certain values are exceeded. The goal is to make it possible for the user to intervene at an early point in time and to initiate preventive maintenance measures for the wire conveying system.

The envelope of the contact pressure is meant to serve for system monitoring, a process in which primarily automated applications entailing cyclically recurring tasks are taken into consideration. For instance, a robot could run along consistently identical trajectories within the identical time. Therefore, for one thing, an envelope could depict the force over the distance—something which, however, might require additional synchronization with the robot control system—or else only over the relative time. Additional associations would be possible by means of cycle-dependent parameters such as, for example, the wire-conveying rate, the current intensity or the laser output. The deviation between the actual value and a target value from the ideal process can be derived via one or more of these parameters. As a rule, this is more precise than a simple threshold value.

Another embodiment of the invention according to the invention provides that the force curves can be stored and then reconciled with reference curves by means of envelope monitoring.

Finally, it can also be provided that set forces, deformations and motor current data of the actuator can be detected, stored and then transmitted in analog form via cables or else in digital form by means of a cable connection or in digital form wirelessly. Possible technical methods are especially laser measuring systems which are used, for example, in wire-drawing plants for the online and real-time control of the diameter and ovality of wires. These are also referred to as laser micrometers.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

BRIEF DESCRIPTION OF THE DRAWINGS

In this context, the following is shown, at times schematically.

For the sake of clarity, identical components or those having the same effect are provided with the same reference numerals in the figures shown below.

DESCRIPTION OF THE DISCLOSURE

The subject matter of the invention relates to wire-feed devices 11, especially those that can be employed not only in the realm of manually guided welding torches but also in machine-guided torches. In the wire-feed device 11 described in the present embodiment, there is at least one drive element 1, 4 that serves to frictionally impart a driving movement to a wire electrode or to a wire 13 that is passing through the wire-feed device 11.

Here, the drive element 1 is configured as a drive roller; as set forth in the invention, it is likewise conceivable to employ a so-called caterpillar track or a drive belt 4 as the drive element. A wire-feed device 11 with the drive element configured as a drive belt 4 can be seen in FIG. 9 and FIG. 10.

Figure 1:
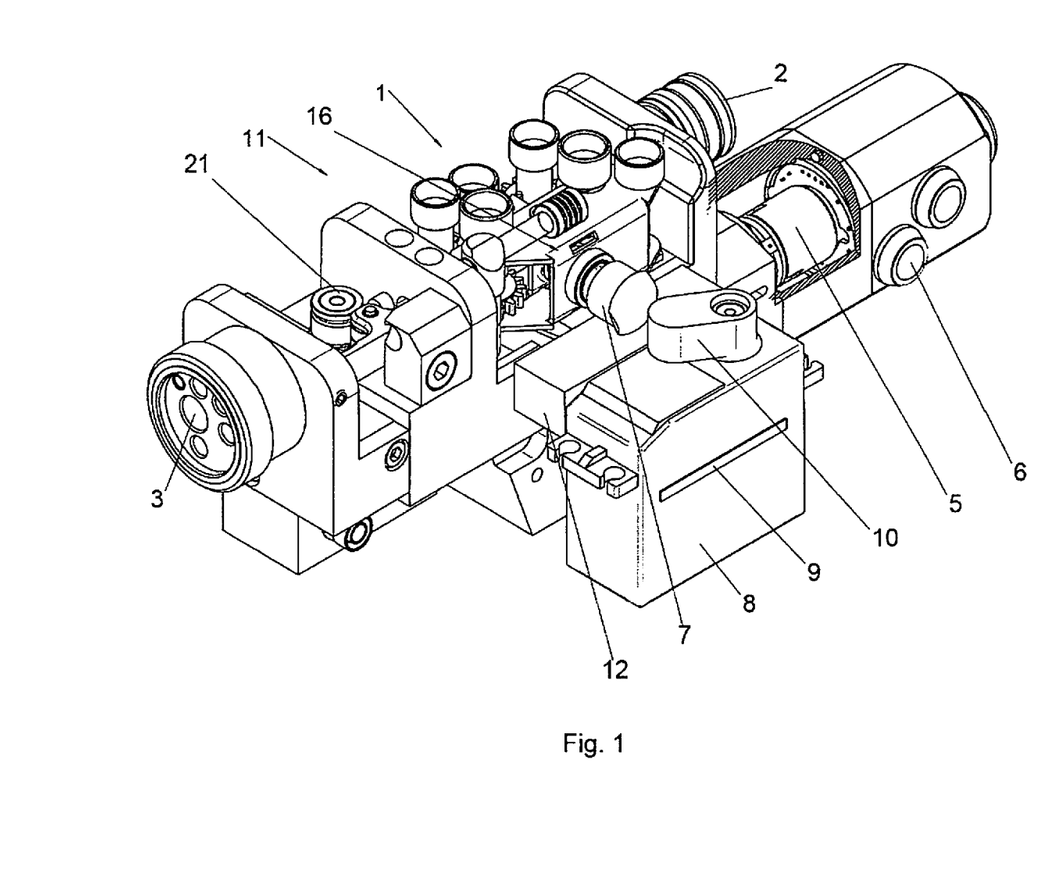
FIG. 1 a perspective view of a wire-feed device with a mechanical measuring apparatus, FIG. 2 a perspective view of the wire-feed device with an optical measuring apparatus, FIG. 3 a top view of a section of the wire-feed device with an actuator and a pressure rocker according to FIG. 1 or 2, FIG. 4 a perspective view of the section according to FIG. 3, FIG. 5 another perspective view of the section according to FIG. 3, FIG. 6 a detailed view of the pressure rocker, FIG. 7 a perspective view of the detailed view according to FIG. 6, FIG. 8 a schematic depiction of the driving movement of a wire, FIG. 9 a perspective view of a wire-feed device with a drive belt, FIG. 10 a perspective view with a section of a wire-feed device with a drive belt, FIG. 11 a perspective detailed view of a wire-feed device with a directly actuated pressure tappet, and FIG. 12 a flowchart for determining the contact pressure.
Figure 2:
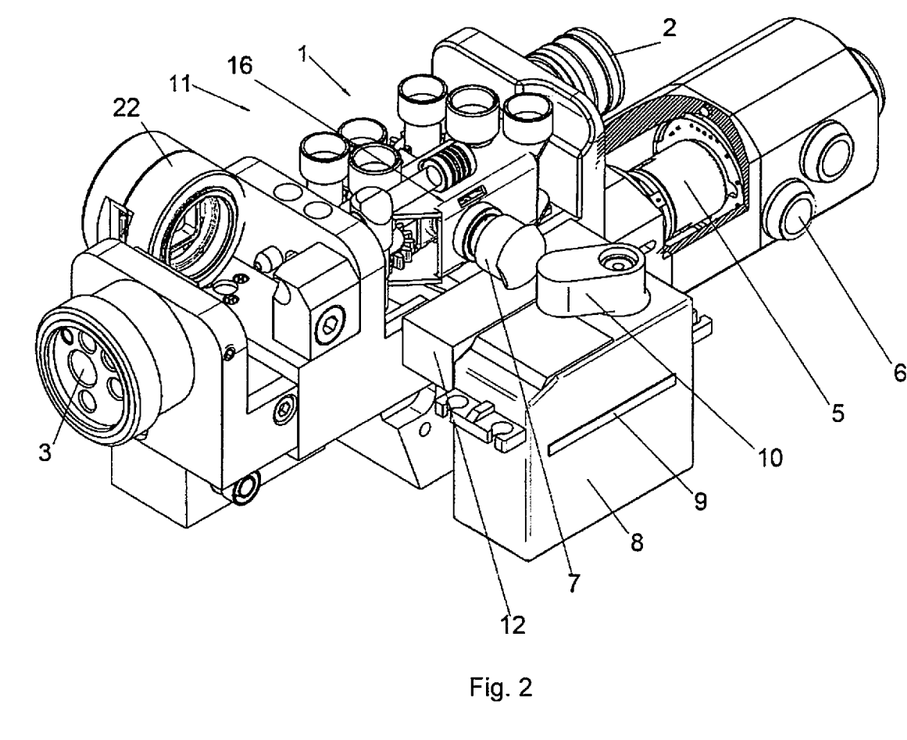

FIG. 1 and FIG. 2 illustrate the wire-feed device 11 that serves to convey the wire 13, especially for a thermal joining device.

Figure 3:
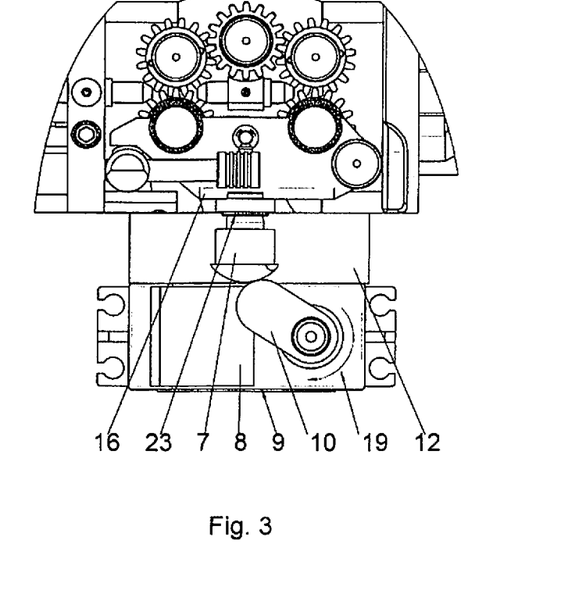
Figure 4:
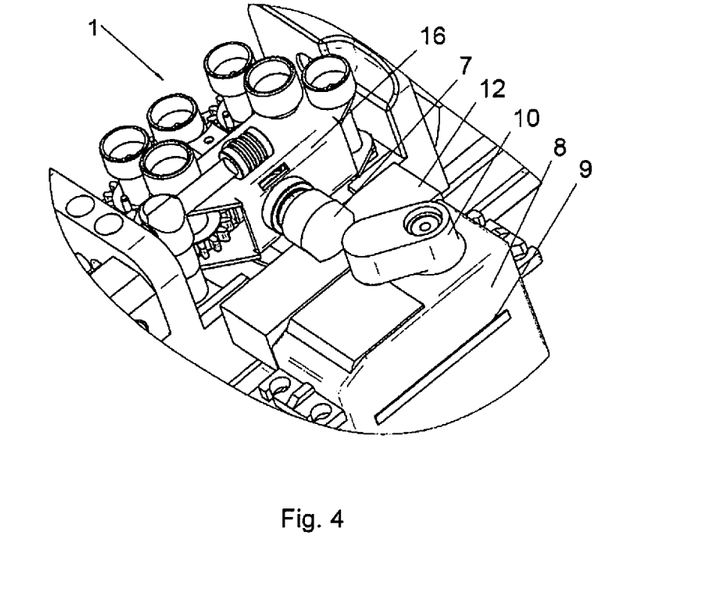
Figure 5:
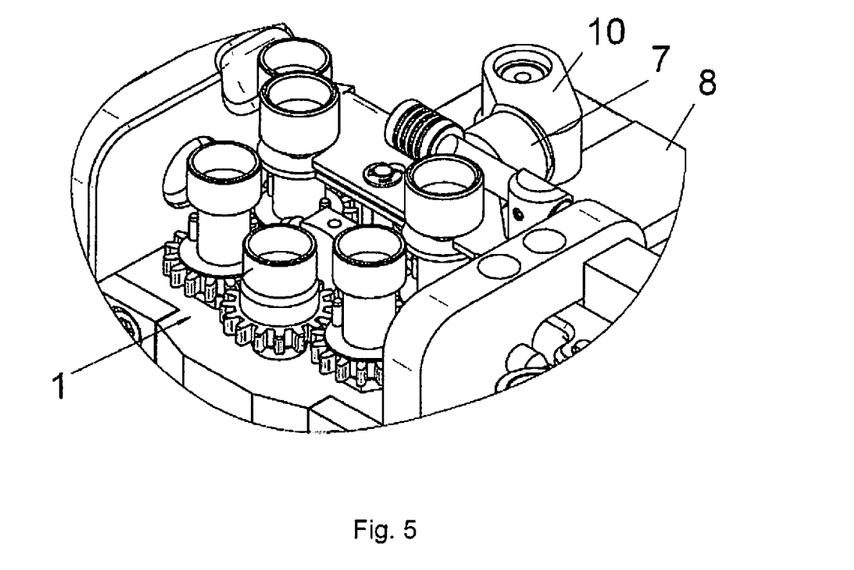

As can be seen in FIG. 1 and FIG. 2 as well as especially in the detailed views of the wire-feed device 11 according to FIGS. 3 to 5, the wire-feed device 11 has a connection port 2 for a tube pack through which the wire, the power and/or an inert gas can be supplied. The wire 13 is inserted into the wire-feed device 11 via a central connection 3.

Figure 8:
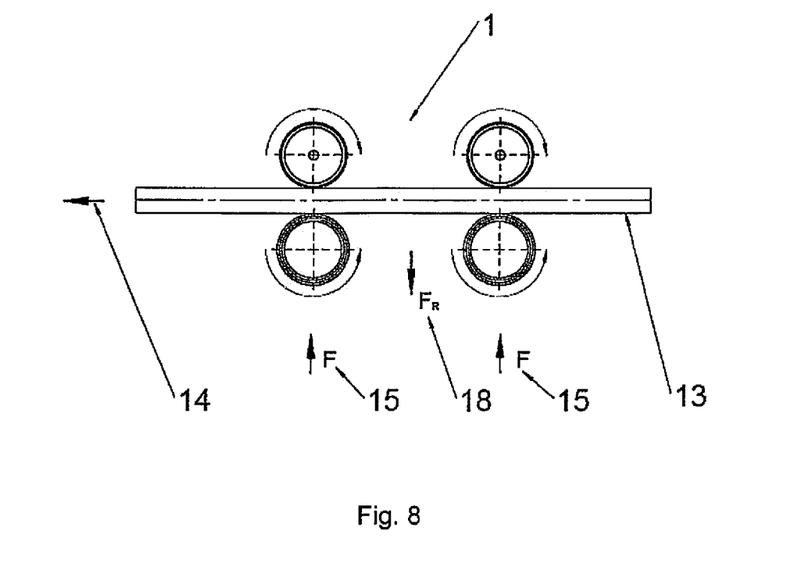

The wire-feed device 11 here has at least one drive element 1 that can be operated by a feed drive 5, whereby said drive element 1 can be placed onto the wire 13 which is inserted all the way through the wire-feed device 11, thereby exerting a contact pressure 15, in order to frictionally transmit a driving movement 14, as illustrated in FIG. 8.

In the present embodiment, the feed drive 5 can be actuated by means of a wire-feed pushbutton 6, as can be seen in FIGS. 1 to 5.

In order to use of wires having different diameters, conveying rollers adapted to the wire diameter can be provided so that, as a result, it is always ensured that approximately the same amount of wire is unrolled by the conveying rollers, even in the case of different wire diameters. This adaptation of the conveying rollers can be implemented by means of different groove shapes that are created on the surface of the conveying rollers. In this manner, despite different wire diameters, the amount of wire can be derived from the rotational speed. Moreover, due to this adaptation of the conveying rollers, no provision needs to be made for a feedback to the motor control unit. This allows the contact pressure acting on the wire to be set according to the invention independently of the wire drive.

Figure 9:
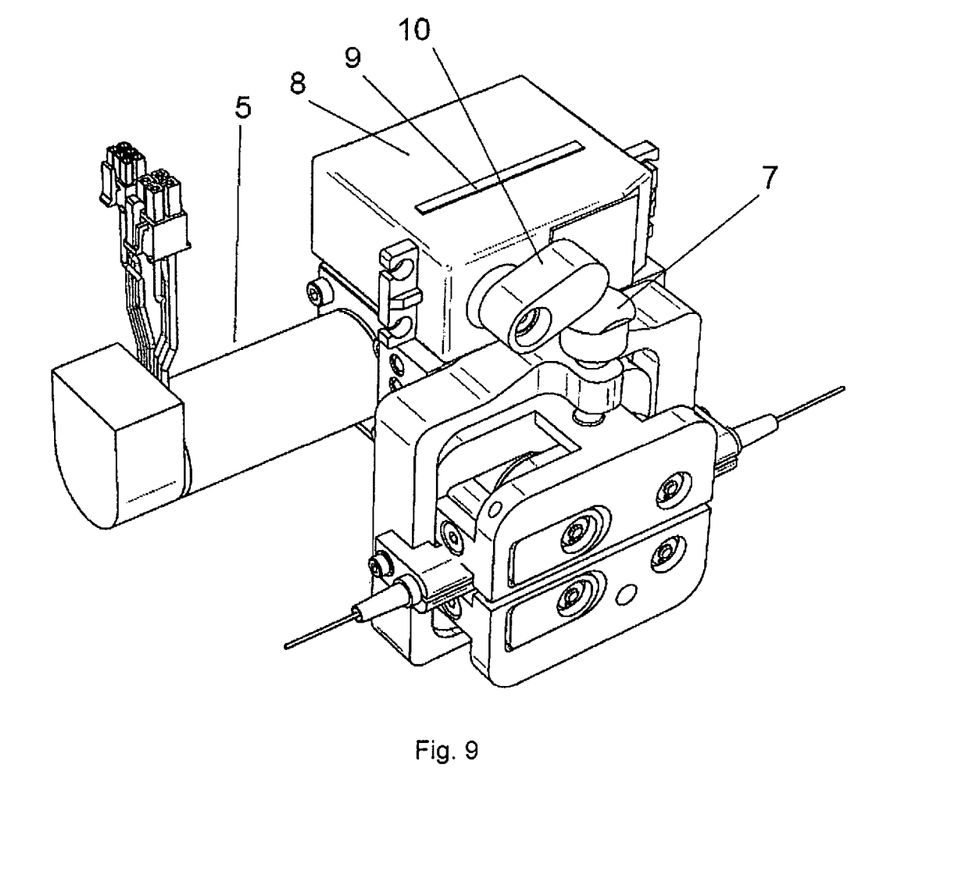
Figure 10:
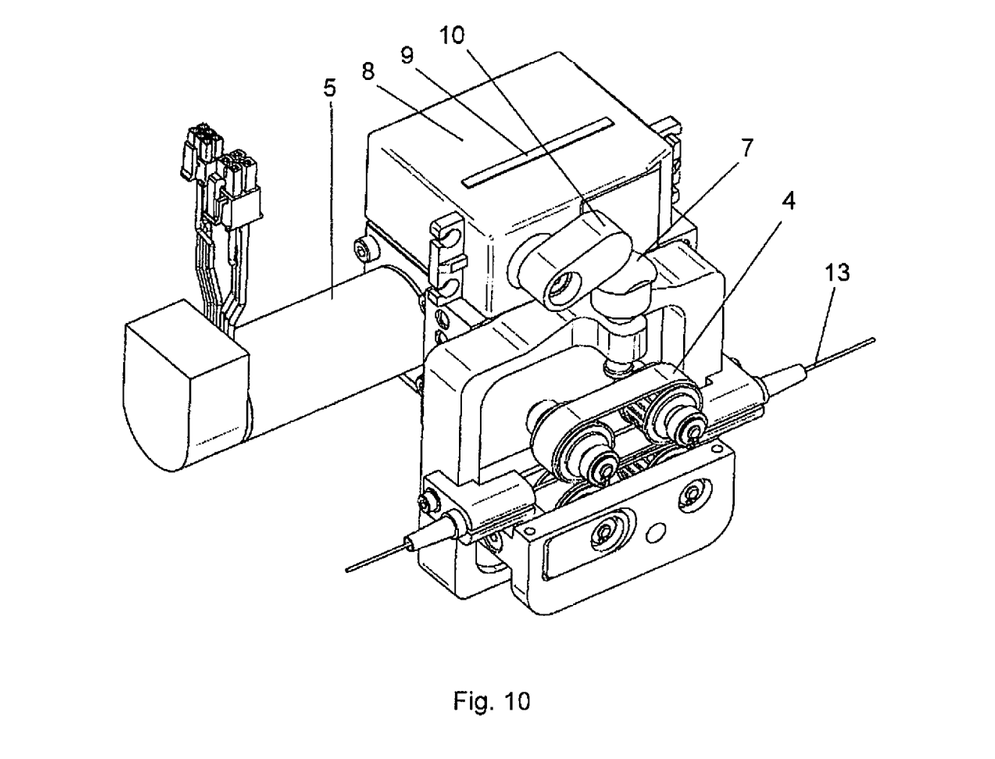

FIG. 1 and FIG. 2 as well as FIG. 9 and FIG. 10 also show an actuator 8 that is coupled to the at least one drive element 1 and that can be controlled by a control unit 12 using the values measured for the contact pressure 15 for variably setting the contact pressure 15 that acts upon the wire 13. Here, the actuator 8 drives an actuating cam 10 that acts upon a force measuring means 7 that is configured as a pressure rocker 16. The pressure rocker 16 can have a restoring element, especially a restoring spring 17, so that the restoring force brings it back to its initial position after the activation.

A display 9, especially an LED unit, can be provided in order to display the contact pressure 15, optionally also for allowing manual readjustment of the contact pressure 15.

In this context, the variable setting or adjustment of the contact pressure 15 is preferably carried out while the feed drive 5 is running. The setting of the contact pressure 15, which is preferably done by means of an electric motor, allows optimal setting, even of drives that are physically difficult to access because of having been integrated into complex installations. For this purpose, the system can be simplified in such a way that it does not involve an active regulation in the process that would cause the force to vary, but rather, the setting is carried out by means of remote control employing, for example, Panel or Bluetooth, WLAN or the like.

Figure 6:
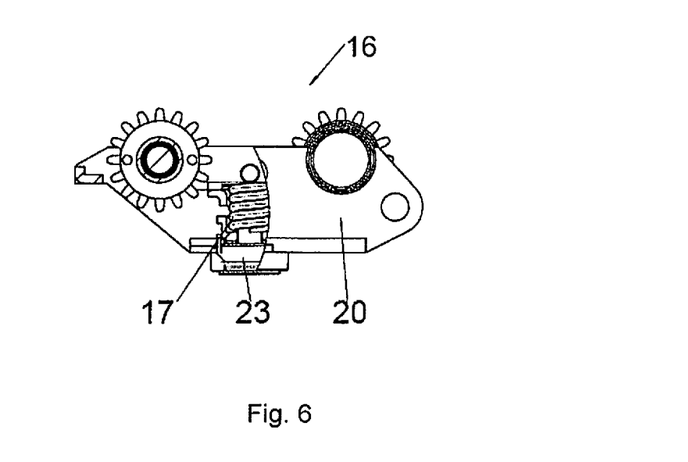
Figure 7:
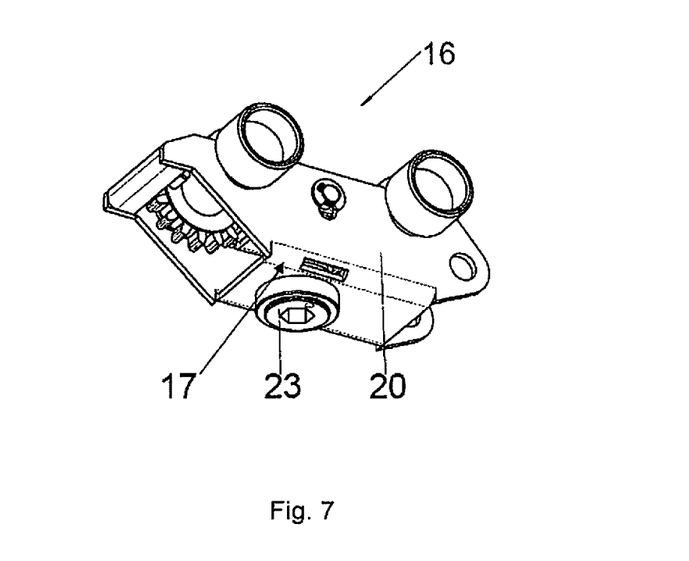

FIG. 6 and FIG. 7 show that the pressure rocker 16 arranged in a housing 20 between the drive element 1 and the actuator 8 is configured as a coupling gear with a pressure tappet 23 and a restoring spring 17 whose restoring force 18 acts counter to the contact pressure 15. An actuator-generated damping movement which serves to set the contact pressure 15 can be reduced in a suitable manner so that it is also possible to use an actuator 8 whose stroke between its end positions is relatively large. At the same time, a suitable selection of the reduction of the coupling gear allows the operating point of the actuator 8 to be set in such a way that the force generated by the actuator 8 can be controlled or regulated particularly easily.

FIG. 1 and FIG. 2 respectively show a measuring means 21, 22 for determining an actuator position 19, whereby FIG. 1 depicts at least one mechanical measuring means 21 and FIG. 2 at least one optical measuring 22 to determine the feed of the wire 13 and/or to monitor the wire geometry. The mechanical measuring means 21 or the optical measuring means 22 detects the feed or the wire geometry optically or mechanically, respectively.

Figure 11:
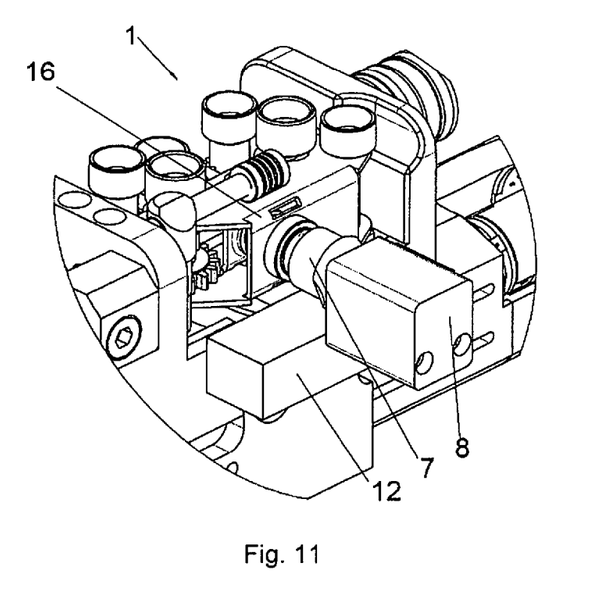

In a perspective detailed view of the wire-feed device 11, FIG. 11 shows a pneumatic or hydraulic contact-pressure force regulator instead of the actuating cam 10. In the embodiment according to FIG. 11, this is a direct drive, whereby the pressure tappet 23 is directly actuated, for example, by means of a pneumatic or hydraulic drive. The other figures show an indirect drive.

Figure 12:
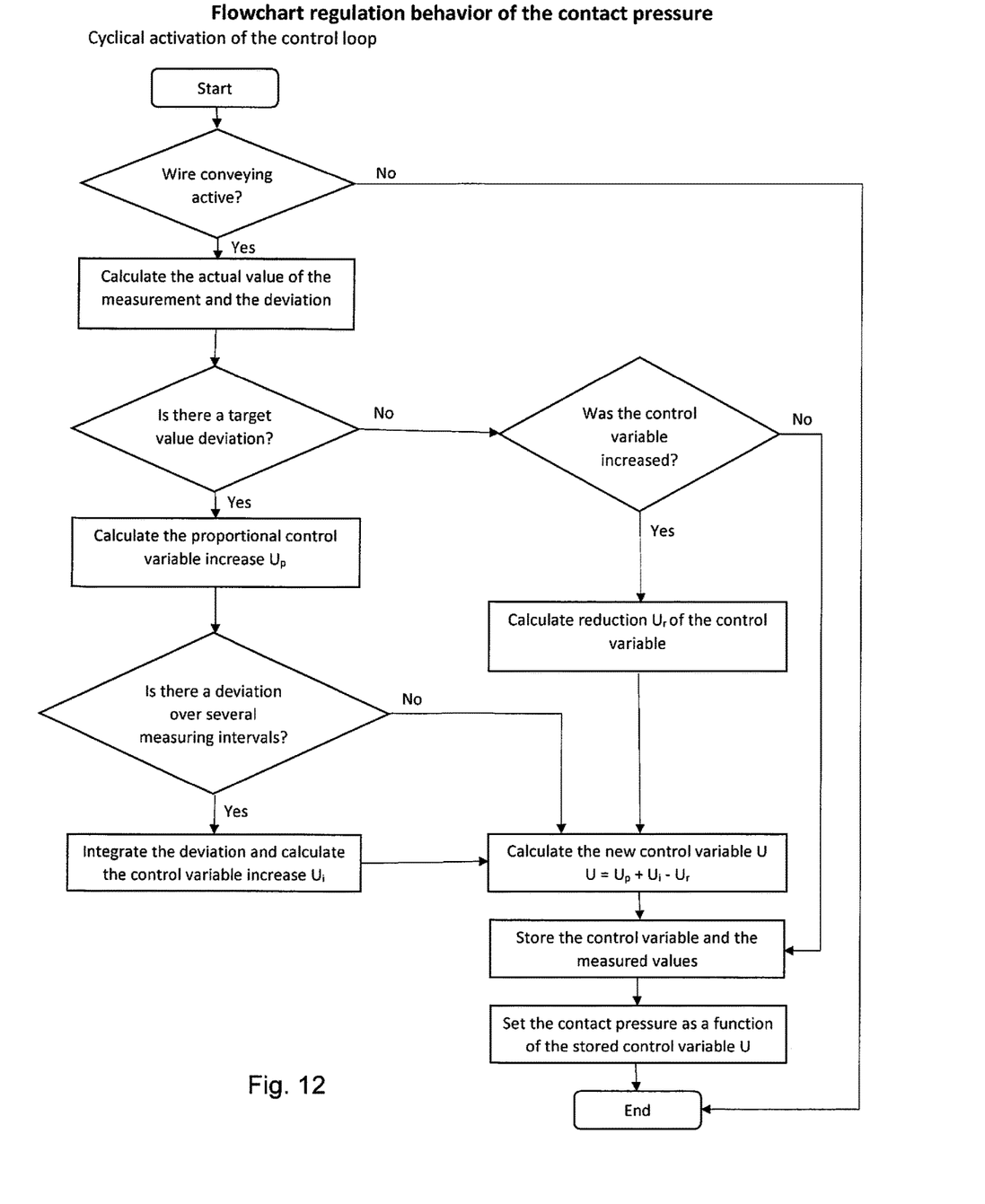

The method according to the invention for feeding a wire 13 that is passing through the wire-feed device 11, especially a wire-feed device 11 of the type described above, will be explained in greater detail below on the basis of a flowchart according to FIG. 12.

The feed drive 5 frictionally transmits a driving movement 14 to the wire 13 via a drive element 1 coupled to the feed drive 5. In this process, the drive element 1 presses against the wire 13 with a contact pressure 15. The contact pressure 15 can be variably set to different values by means of an actuator 8 that is controlled and/or regulated on the basis of the measured values for the contact pressure 15.

Fundamentally, the actuator 8 can be based on an electric motor-powered, a pneumatic or a hydraulic mode of operation, or else on a combination thereof, so that the contact pressure in the present embodiments can be configured so as to be electric motor-powered, pneumatic or hydraulic.

The contact pressure 15 is controlled or regulated as a function of at least one wire-conveying parameter, preferably the slippage between the drive element 1 and the wire 13 that is to be conveyed, and/or as a function of the prescribed feed and/or of the ascertained wire geometry and/or of a welding parameter, especially the welding current.

In this process, when the wire-feed device 11 is put into operation, first of all, the contact pressure 15 is set at an initial value and increased to a value above a slippage limit if slippage between the drive element 1 and the wire 13 occurs.

The initial value of the contact pressure 15 corresponds to the last value set for the contact pressure 15. In the absence of slippage between the drive element 1 and the wire 13 during ongoing operation of the wire-feed device 11, the contact pressure 15 is reduced and, if slippage occurs anew, it is raised once again to a value above the slippage limit.

This setting of the contact pressure 15 can be done either incrementally to discrete values or else continuously or virtually continuously to different values.

In the present embodiment, the contact pressure 15 is regulated as a function of a parameter measured at the wire-feed device 11 or at a welding unit that is connected to the wire-feed device 11.

An algorithm upon which the regulation is based is provided according to the principle of a proportional (P) controller, a (PI) proportional-integral controller, a proportional-integral-derivative (PID) controller, an integral (I) controller or a proportional-derivative (PD) controller.

In particular, in the case of the present embodiment, it is provided for the minimum contact pressure 15 for the wire-conveying system to be ascertained prior to the first time the wire is conveyed during a so-called learning phase. For this purpose, within the scope of a learning run, preferably when a new wire 13 is being threaded in or after a maintenance procedure, the contact pressure 15 is raised incrementally until slippage no longer occurs. This value for the ascertained minimum contact pressure 15 is stored since, as the minimum contact pressure 15, no value falls below it during all of the subsequent wire conveyance procedures until a new learning run is carried out.

After the learning phase, the wire-feed device works under normal operating conditions. In the eventuality that slippage, that is to say, a non-permissible deviation, occurs during normal operation, the contact pressure 15 is raised proportionally to the deviation and to the preceding contact pressure. If a deviation occurs over several measuring points, these deviations are added up and the contact pressure 15 is additionally increased as a function thereof. The contact pressure 15 is thus raised quickly or "aggressively", whereby briefly exceeding the absolutely required contact pressure 15 beyond the requisite value can be accepted. For this reason, a subsequent reduction of the contact pressure 15 is necessary and provided for.

If, after the increase of the contact pressure 15, no new deviation is measured, the contact pressure 15 is reduced proportionally to the preceding increase. The time interval for the measurement is either constant or else it is adapted to the wire-conveying rate that corresponds to a constant wire-conveying quantity.

Following each wire-conveying cycle without a measurable deviation, the contact pressure 15 is additionally reduced. In this process, the reduction is carried out incrementally over several wire-conveying cycles, whereby the minimum contact pressure 15 is known from the learning phase described above.

The values to which the contact pressure 15 is modified or adjusted are temporarily stored and evaluated in order to ascertain the system state.

It is likewise conceivable as set forth in the invention that the force curves are stored and then reconciled with reference curves by means of envelope monitoring.

As set forth in the invention, it can likewise be provided that, at the moment of the geometric reorientation of an arc-welding torch or of the laser optics, the output, for instance, the current intensity or the laser output is changed at a defined trajectory position in each cycle. This increases the resistance of the wire feed, thus translating into a raised contact pressure 15 which, however, can be viewed as a normal process behavior. For instance, if a single threshold value is used for the entire cycle course, then this threshold value has to be taken into account as the maximum value over the entire trajectory, meaning that wire-feeding problems might remain unrecognized at different places along the trajectory.

However, if this trajectory-dependent threshold value is only taken into consideration in the area of the reorientation, then the contact pressure 15 can be compared to the concrete trajectory-dependent target value.

As set forth in the invention, it is likewise conceivable for the wire 13 to run in a meandering pattern over the drive belts 4 as shown in FIGS. 9 and 10. This wire movement can be mechanically coupled to the drive 8. However, a separate drive for the wire is likewise conceivable in order to attain the meandering movement. In this manner, the belt 4 is uniformly abraded over virtually its entire surface area, so that the durability of the belt is markedly increased. The belt width can preferably be about 20 mm.

LIST OF REFERENCE NUMERALS 1 drive element (drive roller)
2 connection port
3 central connection
4 drive element (drive belt)
5 feed drive
6 wire-feed pushbutton
7 force-measuring means
8 actuator
9 display
10 actuating cam
11 wire-feed device
12 control unit
13 wire
14 driving movement
15 contact pressure
16 pressure rocker
17 restoring spring
18 restoring force
19 actuator position
20 housing for the pressure rocker
21 mechanical measuring means
22 optical measuring means
23 pressure tappet

The invention claimed is:

1. A wire-feed device (11) to convey a wire (13) for a thermal joining apparatus, comprising:
   at least one drive element (1) operated by a feed drive (5) and positioned onto the wire (13) that is passing through the wire-feed device (11), said at least one drive element (1) exerting a contact pressure (15) to frictionally transmit a driving movement (14),
   an actuator (8) that is coupled to the at least one drive element (1),
   a pressure rocker (16) between the drive element (1) and the actuator (8), wherein the pressure rocker (16) has an actuating cam (10) that constitutes the output of the actuator (8), and a pressure tappet (23) coupled to the drive element (1) and actuated with the actuating cam (10),
   at least one measuring means (21, 22) configured to determine the actuator position (19) and/or to determine the feed of the wire (13) and/or to monitor the wire geometry,
   a control unit (12) configured to control said actuator (8) using values measured for the contact pressure (15) for variably setting the contact pressure (15) that acts upon the wire (13), wherein the contact pressure (15) is controlled and/or regulated as a function of at least one wire-conveying parameter, and/or as a function of the prescribed feed and/or the ascertained wire geometry, and/or as a function of a welding parameter such as welding current.

2. The wire-feed device (11) according to claim 1, wherein the pressure rocker (16) has a restoring spring (17) whose restoring force (18) acts counter to the contact pressure (15).

3. The wire-feed device (11) according to claim 1, wherein the at least one measuring means (21, 22) detects the wire geometry optically (21) or mechanically (22).

* * * * *